(12) United States Patent
Foland, Jr.

(10) Patent No.: US 8,391,115 B1
(45) Date of Patent: Mar. 5, 2013

(54) METHOD OF IMPROVING QUALITY OF OPTICAL RECORDING USING CIRCUMFERENTIALLY REPEATABLE COMPENSATION

(75) Inventor: William R. Foland, Jr., Golden, CO (US)

(73) Assignee: Marvell International Ltd., Hamilton (BM)

( * ) Notice: Subject to any disclaimer, the term of this patent is extended or adjusted under 35 U.S.C. 154(b) by 542 days.

(21) Appl. No.: 12/367,417

(22) Filed: Feb. 6, 2009

Related U.S. Application Data (60) Provisional application No. 61/028,000, filed on Feb. 12, 2008.

(51) Int. Cl.
*G11B 7/00* (2006.01)
(52) U.S. Cl. .................. 369/47.53; 369/47.5; 369/53.27
(58) Field of Classification Search ............... 369/53.26, 369/53.27, 47.5, 47.53
See application file for complete search history.

(56) References Cited

U.S. PATENT DOCUMENTS

| | | | |
|---|---|---|---|
| 7,088,665 B2 * | 8/2006 | Ogawa et al. ............... | 369/116 |
| 2001/0004344 A1 * | 6/2001 | Roh .......................... | 369/53.22 |
| 2007/0258341 A1 * | 11/2007 | Lin ........................... | 369/47.51 |

\* cited by examiner

*Primary Examiner* — Adam R Giesy

(57) ABSTRACT

Systems, methods and compute program products for compensating for asymmetry variations are described. The asymmetry variations may be monitored both circumferentially and radially across an optical storage medium such that effects of the asymmetry variations may be compensated or minimized. In some implementations, effects of asymmetry variations may be compensated or minimized by first determining light reflected from a circumferential location of an optical storage medium. Then, at least one quality measure based on the detected light is determined. The correlation may be established based on the at least one quality measure and a corresponding circumferential location. A power level of a light source that emits the light is then adjusted based on the correlation.

21 Claims, 4 Drawing Sheets

METHOD OF IMPROVING QUALITY OF OPTICAL RECORDING USING CIRCUMFERENTIALLY REPEATABLE COMPENSATION

CROSS-REFERENCE TO RELATED APPLICATIONS

This application claims priority to U.S. Provisional Application Ser. No. 61/028,000 titled "MEANS OF IMPROVING OPTICAL WRITING (TO IMPROVE QUALITY OF READBACK SIGNAL, NAMELY, ASYMMETRY VARIATION)," filed on Feb. 12, 2008, the disclosure of which is incorporated herein by reference in its entirety.

TECHNICAL FIELD

The subject matter of this application is generally related to optical systems.

BACKGROUND

In many optical disc specifications, an optical disc may comprise two areas, including a user data area and a disc information (lead-in) area. The user data area is generally used to write application data, including video, audio, information tables, file system data and the like. The disc information (lead-in) area generally includes data such as disc size, disc type, disc layout and the like. Some optical storage media (e.g., CD-R and DVD-R) generally can be written only once while others (e.g., CD-RW and DVD-RW) may be written more than once.

Optical storage media generally store data as a sequence (e.g., a continuous track) of "pits" and "lands" on a data-bearing surface that is made reflective by the application of a metallic layer during manufacture. The "lands" are generally parts of the track that are not pits. Pits in read-only storage media are generally molded into the data bearing surface when the discs are formed. Recordable and re-writable disc are generally produced as blanks, and have only a pre-formed groove or "pre-groove" (together with a limited amount of embossed data in most cases) included during molding. Data is stored on recordable or re-writable optical storage media using the same pit-land principle, however the pits are generally added by "burning" a special phase-change material layer applied to the disc substrate.

To write to a recordable or re-writable disc, an optical head can be equipped with a higher power write laser in addition to a read laser. Alternatively, one laser can perform both functions by operating at lower power output for read operations, and a range of higher power outputs for write operations.

The amount of power used to burn pit features directly impacts the shape of the pit features. The geometry of the shape of the pit features can affect the read-back performance of read-back systems. Recordable and re-writable optical storage media are produced by a wide variety of vendors using different materials. Thus, an appropriate writing power level for one medium may be too high or too low for another medium, even if both media are manufactured in accordance with a same specification.

SUMMARY

Systems, methods and compute program products for compensating for asymmetry variations are described. The asymmetry variations may be monitored both circumferentially and radially across an optical storage medium such that effects of the asymmetry variations may be compensated or minimized. In some implementations, effects of asymmetry variations may be compensated or minimized by first determining a correlation between an optical power level and resulting asymmetry. The correlation may be determined by identifying one or more circumferential locations on the optical storage medium, and determining an optimal power level for each circumferential location. A range of optimal power levels and corresponding asymmetry data may be collected. The collected information may then be used to develop the correlation that can be used to minimize effects associated with asymmetry variations.

In some implementations, a method may be used that includes determining light reflected from a circumferential location of an optical storage medium, determining at least one quality measure based on the detected light, establishing a correlation based on the at least one quality measure and a corresponding circumferential location; and adjusting a power level of a light source that emits the light based on the correlation.

In some implementations, an optical system may be used that includes a sensor unit to receive an indication of light reflected from a circumferential location of an optical storage medium and to determine at least one quality measure from received light; and a control unit to establish a correlation based on the at least one quality measure and a corresponding circumferential location and to adjust a power level of a light source based on the correlation.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Optical Disc Drive System Overview

Figure 1:
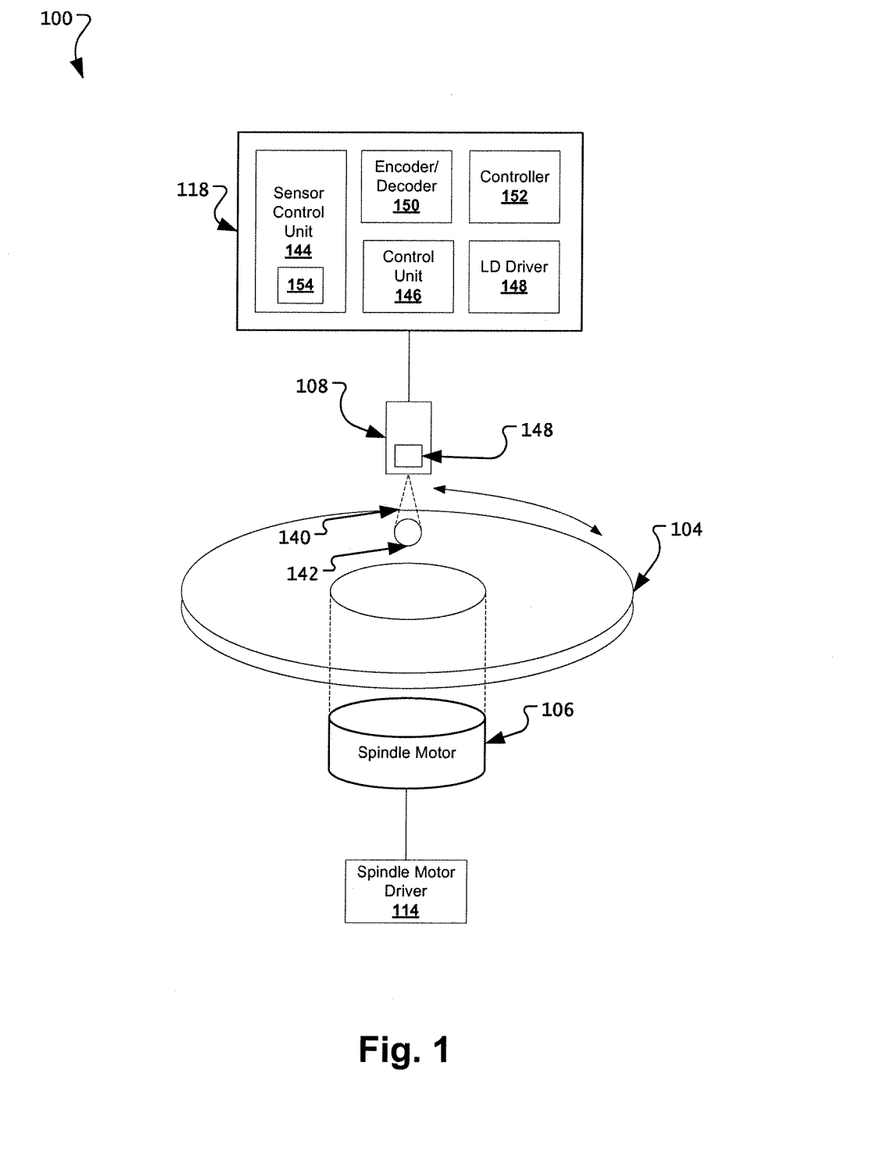
FIG. 1 shows an example optical disc drive (ODD) system.

FIG. 1 shows an example optical disc drive (ODD) system 100. The ODD system 100 includes an optical head 108 for reading or writing optical data onto an optical storage medium 104. The optical head 108 may include an optical source 148 such as, for example, a solid-state semiconductor laser, to generate an optical beam 140. The optical storage medium 104 may be rotated by the spindle motor 106. The spindle motor 106 may rotate the optical storage medium 104 at a controlled speed during read and write operations. In some implementations, spindle motor driver 114 may be configured to control the spindle motor 106 through which the rotation of the disc may be regulated. For example, the spindle motor/VCM driver 114 may generate control signals for controlling the speed of the spindle motor 106.

The optical storage medium 104 may include one or more tracks for recording marks (e.g., as indicated by the optical beam spot 142) which represent the written data or information. Marks on the optical storage medium 104 may be aligned along a track generally spiraling from the center (or inner diameter) of the optical storage medium 104 toward the outer diameter of the optical storage medium 104. In between the marks, spaces may be provided. Depending on the type of the optical storage medium 104 used, the marks may be amorphous regions with low reflectivity, whereas the spaces may be crystalline regions with high reflectivity.

In some implementations, the optical head 108 may be controlled by an optical system 118. The optical system 118 may include a sensor control unit 144, a control unit 146, a laser diode (LD) driver 148, an encoder/decoder 150 and a controller 152. The controller 152 may be used to provide the encoder/decoder 150 with recording data, and the encoder/decoder 150 may use the recording data to provide modulated signals to the optical head 108 through which optical patterns are produced and emitted as the optical beam 140. The intensity of the optical beam 140 may be controlled using a driving signal. The driving signal may be generated, for example, by the LD driver 148 to ensure that the optical head 108 operates with an optimum recording power for reading and writing optical data onto the optical storage medium 104.

The sensor control unit 144 may be used for receiving a sense signal from the optical beam 140, and a control unit 146 for controlling the laser output to a desired value in dependence on the sense signal. In some implementations, a photodetector (e.g., separate from the sensor control unit 144) may be used convert the optical beam 140 into a readback signal that may be used to determine a corresponding readback signal property (e.g., asymmetry) at a circumferential location. The control unit 146 may receive the readback signal and determine the readback signal property based on, for example, the positive and negative peak values of the readback signal relative to a DC signal.

In some implementations, the circumferential location may be determined based on a reference location associated with a given spiral. In these implementations, the angle of the spiral may be a function of a disc spin, and a reference location may be chosen using the angle (e.g., at 0°). While the disc is spinning, the spin loop that controls the spinning may be guided by a spin sensor feedback that may be used to determine when the reference location returns to the original location. Because a phase locked loop also may be used to determine fractions of a spin relative to the reference location, the angle may be accurately measured.

In some implementations, the position information from the disc itself also may be used to determine the angle relative to the reference location. In some implementations, so long as the reference location is selected and kept constant, the actual reference location itself is not critical (e.g., so that the end result is consistent even if different writes using a same disc may choose different angle references as the reference location).

The intensity of the optical beam 140 may vary between an intensity adequate to cause detectable changes in the optical properties of the optical storage medium 104, and an intensity that is insufficient to cause any change in optical properties of the optical storage medium 104. In some implementations, controlling the power of the optical source 148 may depend on the length of the mark to be written. When the optical storage medium 104 is scanned with the optical beam 140 whose intensity is being modulated, an information pattern is formed on a recording layer of the optical storage medium 104. The information pattern formed on the recording layer may be read by scanning the pattern with the optical beam 140 (e.g., one with a lesser power than that used for writing data) of a constant intensity. During scanning, the optical beam 140 reflected from the record layer of the optical storage medium 104 may be modulated in conformity with the information pattern being scanned. The modulation of the read beam may subsequently be detected and processed, for example, by the sensor control unit 144 to generate a readback signal indicative of the beam modulation.

The optical system 118 may command the optical head 108 to irradiate the optical beam 140 through one or more optical elements (e.g., optical lens, beam splitters, collimators and the like) configured to focus the optical beam 140 onto an optical beam spot 142 at a circumferential location. The one or more optical elements may be formed as part of the optical head 108. Alternatively, the one or more optical elements may be included as components of the optical system 118 to refine and improve the focus of the optical beam 140. In these implementations, the one or more optical elements may include, for example, tracking elements (e.g., tracking actuators) for performing fine positioning of the optical beam spot 142 (e.g., in a radial direction oriented around the center of the track).

When writing data on the information layer of the optical storage medium 104, the power of the optical beam 140 may be controlled to generate optically detectable marks on the optical storage medium 104. The written marks may be read by the optical system 118 so as to generate a readback signal that may be used to analyze the information associated with the written marks. In some implementations, the optical system 118 also may detect tracking errors and/or focusing errors. These errors may be fed back to the optical head 108 to further improve the read/write process. The readback signal, in some implementations, may be forwarded to, for example, a demodulator, deformatter or other output elements to retrieve the information from the readback signal.

In some implementations, the sensor control unit 144 also may include a forward-sense diode 154. The forward-sense diode 154 may be used to detect, for example, a small linear percentage of the laser output (and/or power of the reflected light). Based on the detected amplitude, the control unit 146 may generate a feedback signal to control the laser output of the optical source 148.

Optical Storage Medium Overview

An optical storage medium can be manufactured based on various disc and application specifications. Disc specifications can include Blu-Ray (BD), high-definition (HD), CD-ROM and DVD-ROM. Generally, the disc specification of an optical storage medium can define the physical characteristics of the disc including, without limitation, mechanical and optical properties, optical signal characteristics, physical arrangement, writing methods, and testing conditions. Similarly, application specifications can include, for example, DVD-Video for video content, DVD-Audio for audio content, and DVD-VR and DVD+VR for real-time video recording (e.g., used in camcorders and personal video recorders).

In many optical disc specifications, an optical storage medium may include one or more user data areas and one or more disc information (lead-in) areas. A user data area may be one on which application data is to be written. Application data that can be written on the user data area may include, for example, video, audio, information tables, file system data and the like. Similarly, disc information (lead-in) area may include data that can be used to convey information such as, without limitation, a disc size, disc type, disc layout and the like.

An optical storage medium may store data as a sequence (e.g., as a continuous track) of "pits" (or "marks") and "lands" (or "spaces") on a data-bearing surface created using a metallic layer during manufacturing of the optical storage medium. The lands are generally parts of a track that are not pits. Pits in read-only storage media may be generally molded into the data bearing surface when the discs are formed. Recordable and re-writable discs may be produced as blanks, and may have a preformed groove or "pre-groove" (together with a limited amount of embossed data) included during molding. Data may be stored on recordable or re-writable optical storage media using the same pit-land principle, while the pits may be added by "burning" a special phase-change material layer to the disc substrate.

To write to a recordable or re-writable disc, the optical head 108 may be equipped with a high-power write laser and a low-power read laser. Alternatively, a single laser may be used to perform both the write and read functions by operating at, for example, lower power output for read operations, and higher power output for write operations.

The amount of power used to burn pit features may be critical to the shape of those features. The geometry of the shape of the pit features may affect the read-back performance of read-back systems. Recordable and re-writable optical storage media are produced by a wide variety of vendors using different materials. Thus, an appropriate writing power level for one medium may not be appropriate (e.g., too high or too low) for another medium, even if both media are manufactured in accordance with the same specification (e.g., where both medium are DVD-R).

In some implementations, one or more calibration areas may be defined on a medium for calibrating an optimal power level to be used during writing (or reading). Specifically, each calibration area may be used to perform optimal power calibration (OPC) procedure (as will be discussed in greater detail below) by writing data at various power levels. The written data may subsequently be read back to determine an optimal writing power level.

Optimal Power Calibration

In order to perform OPC, one or more power calibration areas (or OPC areas) on the optical storage medium 104 may first be identified (e.g., by the manufacturers). Then, pattern data (e.g., eight-to-fourteen modulation (EFM) or similarly encoded data) may be written to an OPC area. This pattern data may be stored in random access memory (RAM), non-volatile memory such as flash memory or electrically erasable and programmable read only memory (EEPROM), and/or other suitable electronic data storage (e.g., if OPC is performed more than once). The written data at various power levels may then be read back to determine an optimal writing power level suitable for writing the actual data.

In some implementations, a calibration process may include receiving pattern data and instructions synchronized with the pattern data. For example, one or more segments (e.g., one or more codewords and merging bits) of a calibration bitstream containing both the pattern data and calibration instructions may be received (e.g., received from a memory module or otherwise retrieved from a data storage device).

In some implementations, instructions and pattern data may be extracted from the bitstream where the instructions may then be synchronized with the pattern data. Optionally, the pattern data also may be corrected at this point based on feedback information (as will be discussed in greater detail below).

The instructions may be checked to determine whether writing characteristics (e.g., a given power level of the laser used for writing) should be changed before writing the corresponding pattern data to the optical storage medium. If so, the writing characteristic may be changed. Then, the pattern data may be written to the optical storage medium (e.g., to an OPC area on the medium, or to other free space on the medium) in accordance with the received instructions. The optical storage medium may be an optical storage medium such as a write-once optical disc (e.g., a CD-R, DVD-R, or DVD+R) or a rewritable optical disc (e.g., a DVD-RW, DVD+RW, or DVD-RAM). In other implementations, the optical storage medium may be a Blu-Ray disc (BD) or HD-DVD.

In some implementations, if the pattern includes multiple blocks of data, each block may be sequentially processed. For example, after a first block of data is written onto an OPC area, a next block of data may be processed and written onto the same or different OPC area.

Upon writing all blocks of data onto the available OPC areas, the written data may be read to generate a readback signal. The readback signal may subsequently be processed in accordance with the instructions previously received. Characteristics of the readback signal may be analyzed with respect to the pattern data and/or instructions stored in the calibration bitstream previously received. For example, one or more segments of the calibration bitstream may be retrieved from the optical storage medium (e.g., from one or more OPC areas on the medium). A relationship may then be established between the characteristics of the readback signal and the previously used write characteristic. Where the test writing characteristics were changed before the corresponding pattern data was written to the optical storage medium, the new test writing characteristics and the characteristics of the readback signal may be established.

If there are multiple blocks of data, the foregoing process may be reset to correlate any subsequent readback signals with the new writing characteristics (e.g., new power levels). For example, the next block of pattern data may be read from the associated OPC area and the resulting readback signal may be analyzed with respect to the pattern data and/or instructions extracted previously.

After the final instruction has been processed, in some implementations, an optimal write characteristic may be determined using the relationship between writing characteristics used for calibration (e.g., optical power levels) and characteristics of the readback signals (e.g., asymmetry data). Where more than one readback signal is generated for a specific process, an optimal write characteristic may be determined using all of the relationships established between each readback signal and its associated writing characteristic.

To increase the recording speed, a running OPC or a walking OPC may be performed to control the laser output of the optical source 148 at the time of recording. For example, in running OPC, the intensity of returned light (e.g., the reflected optical beam) applied to the optical storage medium 104 for information recording may be detected and the laser output of the optical source 148 may be corrected based on the detection result. In walking OPC, recording operation may be periodically stopped after a certain band or region of the optical storage medium 104 has been written, and the recording quality of the signal recorded immediately before stoppage may be measured. Based on the quality measurement result, the laser output of the optical source 148 may be adjusted accordingly to provide an optimal laser output.

Asymmetry

As discussed above, a precise laser output for recording data onto an optical storage medium (e.g., CD, DVD, BD or HD-DVD) may depend on various factors such as, without limitation, the specific disc used, the recording speed, and the location of the disc where data is to be recorded. To provide an optical power level suitable for a particular data write (or data read), asymmetry may be measured. For example, the optical head 108 may read a particular mark and generate a readback signal (e.g., using the sensor control unit 144) based on the read information. The readback signal may then be processed to retrieve asymmetry data associated with the mark. In this example, where a specific mark (or track) indicates an asymmetry higher than a targeted asymmetry, the optical power level used by the optical source 148 may be reduced so that subsequent writing may meet the targeted asymmetry. Similarly, where a specific mark indicates an asymmetry lower than a targeted asymmetry, the write power may be increased to minimize or remove the asymmetry variation.

In some cases, the asymmetry may vary across the disc, even when a fixed optical power is used for data writing (or reading). The variation may be due to the uneven thickness of the substrate caused by imperfect manufacturing. This uneven thickness may vary radially (e.g., from the inner diameter to the outer diameter), or circumferentially (e.g., on one side of the disc to the other). Where the uneven thickness varies circumferentially, the side-to-side variation may be viewed as a periodic thickness variation as the disc is rotated. Hence, the circumferential variation in asymmetry may be due to repeatable causes that repeat circumferentially.

While this is one manner of causing a repeatable circumferential variation in the quality of the readback waveform of the recorded signal, other ways exist that also can be addressed as will be described in greater detail below.

Additionally, optical power level applied during writing directly influences the characteristics of the features written to the optical storage medium 104, and the characteristics of these features also contribute to the quality of the readback signal generated while reading the optical storage medium 104. Because the quality of the readback signal provides an indication as to whether the write (or read) power being used is optimal, an inaccurate readback signal (e.g., a low quality readback signal) may lead to an inaccurate asymmetry measurement that may cause erroneous adjustment of the laser output. Therefore, if asymmetry variations are not monitored and corrected, the laser output can be adversely affected. In cases where the optical storage medium 104 is sensitive to laser output, excessive optical power level can lead to read and write instability that can degrade the quality of the data being read and written, and cause undesirable damage to the optical storage medium 104.

Accordingly, it may be desirable to remove such asymmetry variations, for example, before data is written or concurrently with data writing, by monitoring the asymmetry variations both circumferentially and radially across the optical storage medium 104 such that the effects of asymmetry variations may be minimized or compensated.

In some implementations, effects of asymmetry variations may be minimized by first determining a correlation between the optical power level and resulting asymmetry for a given optical storage medium. In some implementations, the correlation may be determined by identifying one or more circumferential locations (e.g., one or more spiral bands) on the optical storage medium 104, and determining an optimal power level for each circumferential location. A range of optimal power levels and corresponding asymmetry data may be collected. The optical system 118, in some implementations, may then use the collected information to develop the correlation. The correlation, in some implementations, may be continuously or periodically updated concurrently with reading data (e.g., data in the OPC calibration areas) by the optical system 118 so as to improve the accuracy and precision of the correlation.

When data is read from a circumferential location, as discussed above, a readback signal may be generated by, for example, the sensor control unit 144 so that a corresponding asymmetry may be detected. In some implementations, based on the detected asymmetry, a correction signal may be generated to cancel out the asymmetry identified at that circumferential location, or alternatively, to minimize the difference between the identified asymmetry and the targeted asymmetry.

In some implementations, the correction signal and the correlation information (e.g., optical power level, asymmetry, etc.) may be stored into the memories of the control unit 146 or local cache for convenient retrieval. Alternatively, information associated with the correction signal and the correlation may be recorded into a predetermined recording area of the optical storage medium 104.

Furthermore, it should be readily recognize that the subject matter described herein is not limited to asymmetry variations, and that other characteristics such as error rate, jitter or other metrics also may be used to evaluate the quality of the readback signal.

Power-Asymmetry Correlation

In some implementations, the correlation between the optical power level and the asymmetry may be determined over a range of circumferential locations. The correlation may then be used to improve the quality of the readback signal generated while reading (or writing) data, which may improve subsequent data writing once the optical power level is adjusted based on the readback signal.

In these implementations, the asymmetry, which may be measured using the parameter $\beta$, may be determined as a function of laser power with respect to a circumferential position. Specifically, the optical system 118 may measure the $\beta$ value of a recording mark recorded on the optical storage medium 104 based on the readback signal generated from the reflected optical beam 140 from the optical storage medium 104 with respect to the circumferential location over which the optical head 108 is positioned. The measured $\beta$ value may indicate the extent to which a power level deviates from an average value determined based on, for example, a maximum level and a minimum level associated with the readback signal.

Ideally, the optimum $\beta$ value may be fixed over a constant laser power. However, in practical applications, the $\beta$ parameter may vary as the optical head 108 moves from one circumferential location on the optical storage medium 104 to another circumferential location. That is, the measurement of the $\beta$ parameter may gradually deviate from a targeted $\beta$ value as the optical head 108 moves away from a circumferential location. This deviation may partially be contributed by, for example, the optical properties (e.g., different reflection coefficient, varying layer thickness and the like) of the optical storage medium 104 or manufacturing imperfections of the optical storage medium 104, which cause one region of the optical storage medium 104 to be different from another region of the optical storage medium 104.

Additionally, because of mechanical imperfections, signal sensitivity to laser feedback also may vary from drive to drive. Such mechanical defects may give rise to $\beta$ deviations that may cause erroneous measurement of the asymmetry.

Furthermore, prior to recording data, a test write may be performed on a small segment of the media (e.g., using an OPC process). This segment may be along an inner radius of the optical storage medium 104. The test write may write at various optical power levels and pulse shapes. By reading back the test written pattern, an optimum power level may be determined for later recording of data. However, a typical test write may use only a fraction (as opposed to a full revolution) of the optical storage medium 104 as reference for determining an optimum write power. Because the optimum write power as determined by the OPC process might not consider differences in optical properties among various regions of the optical storage medium 104, a write power determined to be optimal for one region based on a readback signal generated from a recorded mark might not necessarily be optimal for other regions of the optical storage medium 104. For example, the level of asymmetry from an inner diameter (ID) of the optical storage medium 104 to the outer diameter (OD) may vary due to irregularities, for example, in the thickness of the recording layer of the optical storage medium 104. Because OPC process is generally performed beginning at the ID, the optimum power determined with respect to the ID may not always be applicable over the regions located at the OD.

Figure 2:
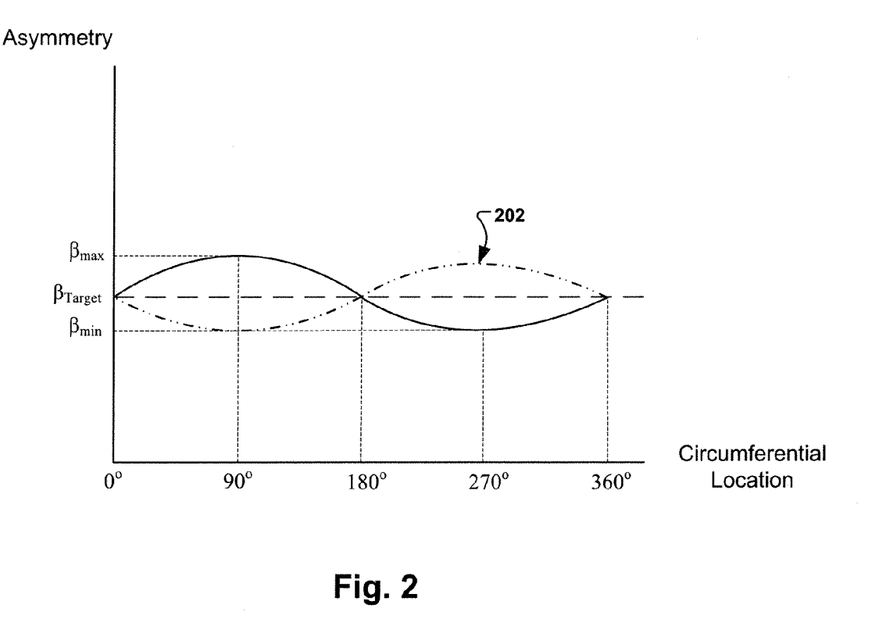
FIG. 2 is a graph showing an example change in asymmetry over a range of circumferential locations on an optical medium.

FIG. 2 is an example graph showing a change in asymmetry over a range of circumferential locations on the optical storage medium 104. As shown in FIG. 2, with a constant write power, the asymmetry may vary circumferentially across the entire surface of the optical storage medium 104. As an example, when the optical head 108 is at the 0° angular position (e.g., where the optical head 108 is at a reference point), the asymmetry parameter $\beta$ is at the targeted asymmetry parameter $\beta_{Target}$. As the optical head 108 moves away from the reference point, the asymmetry parameter $\beta$ gradually deviates from the targeted asymmetry parameter $\beta_{Target}$. When the optical head 108 is positioned 90° away from the reference point, the asymmetry parameter $\beta$ reaches its maximum level $\beta_{max}$, which begins to approach back to the targeted asymmetry parameter $\beta_{Target}$ as the optical head 108 goes around the optical storage medium 104. Specifically, when the optical head 108 is positioned 180° away from the reference point, the asymmetry parameter $\beta$ is at the targeted asymmetry parameter $\beta_{Target}$. As the optical head 108 continues to scan the optical storage medium 104 circumferentially, the asymmetry parameter $\beta$ reaches its minimum level $\beta_{min}$ when the optical head 108 is positioned 270° away from the reference point, which again gradually approaches back to the targeted asymmetry parameter $\beta_{Target}$ as the optical head 108 moves toward the original reference point.

As discussed above, due to imperfections in manufacturing, each circumferential location may have different optical properties (e.g., different reflection coefficient, varying recording layer thickness and the like). These varying properties may cause each circumferential location to have a different write power in order to achieve the targeted asymmetry parameter $\beta_{Target}$.

Thus, in some implementations, to minimize asymmetry variation (e.g., to minimize the asymmetry parameter $\beta$ from deviating from the targeted asymmetry parameter $\beta_{Target}$) and to stabilize asymmetry parameter $\beta$ over a range of circumferential positions, a correlation between the optical power level and the asymmetry may first be determined. Specifically, the correlation between the optical power level and the asymmetry may be determined circumferentially. The circumferential correlation may be established, in some implementations, by first identifying one or more circumferential locations on the optical storage medium 104 (e.g., identifying one or more spiral bands). Then, an optimal power level may be determined for each circumferential location. The optimal power level and corresponding asymmetry may be subsequently used to establish the correlation between the optical power level and the asymmetry for each circumferential location.

In some implementations, the optimal power level (and hence the accuracy associated with the correlation between the optical power and the asymmetry) may be enhanced by sweeping each individual circumferential location with a range of optical power levels such that an optimal power level may be determined and selected from the range (e.g., the power level that provides an asymmetry closest to the targeted asymmetry parameter $\beta_{Target}$ may be selected as the optimal power level).

Figure 3:
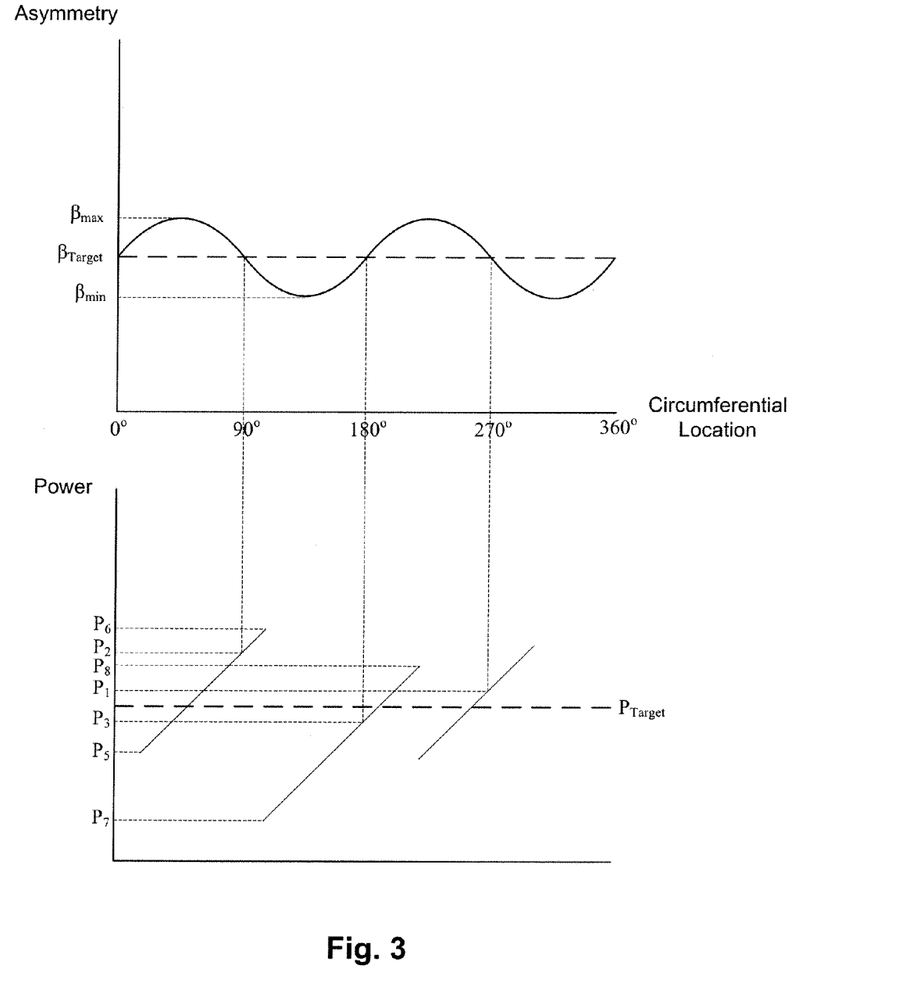
FIG. 3 shows an example correlation between optical power level and asymmetry.

FIG. 3 shows an example correlation between the optical power level and the asymmetry. Referring to FIG. 3, as the optical head 108 sweeps across the optical storage medium 104 at various circumferential locations, a range of asymmetry values may be collected. As shown, during a particular sweep, the optical system 118 may ramp up (or ramp down) the optical power level of the optical source 148 as the optical head 108 approaches a particular circumferential location. For example, the optical power level may be ramped up from optical power level $P_5$ to optical power level $P_6$ as the optical head 108 moves away from the reference point (e.g., circumferential location at 0°) and approaches the circumferential location at 90° away from the reference point. The ramping power, in some implementations, may be terminated when the optical power level reaches a predetermined power level (e.g., optical power level $P_6$).

Upon terminating the ramping power, in some implementations, the ramping power may be re-initiated. In these implementations, the range of optical power levels associated with the re-initiated ramping power may be different from those previously used. For example, where the first cycle utilizes a ramping power that ramps from optical power level $P_5$ to $P_6$, the second cycle may utilize a ramping power that ramps from optical power level $P_7$ to $P_8$.

As the optical head 108 sweeps across the optical storage medium 104, a range of asymmetry values may be determined with respect to the corresponding circumferential location. As an example, the circumferential location at 90° with respect to a reference point (e.g., the reference point as defined by 0°) may indicate that the asymmetry parameter $\beta$ at that circumferential location is the same as the targeted asymmetry parameter $\beta_{Target}$ (i.e., deviation is at a minimum). At this circumferential location, a corresponding optical power level (e.g., optical power level $P_2$) may be identified as the optimum optical power level with respect to the circumferential location at 90°.

As the optical head 108 continues to move across the optical storage medium 104, a second circumferential location (e.g., at 180°) that yields a minimal deviation between the actual asymmetry parameter and the targeted asymmetry parameter $\beta_{Target}$ also may be identified. At this circumferential location, a corresponding optical power level (e.g., optical power level $P_3$) may be identified as the optimum optical power level with respect to this circumferential location at 180°.

Similarly, a third circumferential location (e.g., at 270°) that indicates that the actual and the targeted asymmetry parameter $\beta_{Target}$ are substantially equal may be detected, and a corresponding optical power level (e.g., optical power level $P_1$) also may be identified. In sum, by identifying an optical power level and the corresponding asymmetry for each circumferential location, a correlation between the optical power level and the corresponding asymmetry may be developed.

In some implementations, an average power level $P_{avg}$ may be determined based on the various optimum power levels collected. Using the example given above, an average power level $P_{avg}$ may be determined based on optical power levels $P_1$, $P_2$ and $P_3$. In some implementations, the average power level $P_{avg}$ may then be selected as the actual write power for writing data. In these implementations, by performing data writing using the average power level $P_{avg}$, asymmetry variation between circumferential locations is minimized, which in turn, can improve the quality of the readback signal.

In some implementations, the optical source 148 may be set based on the average power level $P_{avg}$, and subsequent data writing may be performed using the average power level $P_{avg}$. In these implementations, where asymmetry variation is detected, a correction signal (as will be discussed below in greater detail) may be generated to offset the asymmetry variation. The correction signal, in these implementations, may depend on, for example, the average power level $P_{avg}$ as well as the difference between the detected asymmetry and targeted asymmetry. For example, the correction signal may increase or decrease the average power level $P_{avg}$ by a predetermined amount, where the predetermined amount reflects the difference between the detected asymmetry and targeted asymmetry.

In some implementations, as the optical head 108 moves across the optical storage medium 104, the optical system 118 may identify the circumferential location over which the optical head 108 is positioned, and determine the asymmetry associated with this circumferential location. Using the correlation, the optical system 118 can increase or decrease the optical power level of the optical source 148 given an asymmetry. Based on such information, as the optical head 108 performs data writing, the optical system 118 may use the sensor control unit 144 to detect the light reflected from the optical storage medium 104 to determine the asymmetry at that particular circumferential location. The detected light may then be processed (e.g., by the control unit 146) as a readback signal. By referring to the correlation between the optical power level and the asymmetry, the optical system 118 may provide a correction signal to cancel out the asymmetry determined from the readback signal. For example, referring to FIG. 2, assuming that the optical head 108 is writing data at the 90° circumferential location, the asymmetry as detected by the sensor control unit 144 at this location may be $\beta_{max}$. By providing a correction signal to adjust the current optical power level that results in, for example, an asymmetry 202 inverse to $\beta_{max}$ (e.g., optical power level that provides $\beta_{min}$), the deviation of the asymmetry 202 from the targeted asymmetry parameter $\beta_{Target}$ may be regulated (e.g., by canceling out the detected asymmetry), thereby maintaining the targeted asymmetry parameter $\beta_{Target}$ at this circumferential location.

In some implementations, the optical power adjustment may be made in real time as the optical head 108 writes data onto the optical storage medium 104 such that the asymmetry at that point is immediately corrected. Alternatively, the optical power adjustment may be made with respect to subsequent data writing after the asymmetry has been determined.

Forward Sense Diode

The sensor control unit 144, which may include a forward sense diode 154, may be used to measure an optical power level and control the radiation output of the optical source 148 based on the measurement. In some implementations, the output signal of the forward sense diode 154, which may be indicative of the laser output presently used by the optical source 148, may be an input signal for the control unit 146, which may control the laser output of the optical source 148 to a desired read or write power during the settings and/or the read and/or write mode. More specifically, if a deviation exits between the desired target level of power and the actual value of the power, the control unit 146 may generate appropriate control signals to the optical source 148 to correct the actual power level.

Signals generated by the forward sense diode 154 can be noisy. Thus, in some implementations, a filter may be coupled to the output of the forward sense diode 154 to filer and reduce high (or low) frequency content of variation (e.g., generated due to disc spinning). For example, the forward sense diode 154 may be coupled to a low pass filter and a phase locked loop to maintain a relatively constant laser power output from spin to spin while varying only slightly as conditions such as temperature or recording speed change. By filtering signals output by the forward sense diode 154, the laser power may further be regulated and improved.

In some implementations, the optical system 118 may utilize a set of forward sense setpoint values available in, for example, the drive firmware in determining the optical power level presently used by the optical source 148. In these implementations, the output of the forward sense diode 154 may be compared with one of the forward sense setpoint values to determine the laser output presently used.

In some implementations, the forward sense setpoint values may be used in a slow power loop that strives to keep the forward sense feedback at a specified level (or setpoint) by increasing or decreasing the laser power during the write (or read) mode. The setpoint may be determined by an OPC process discussed previously that may be performed on each disc prior to writing user data. During the OPC process, the relationship between power and asymmetry or other measurement parameters such as β or DC average may be determined in advance (e.g., by designers or manufacturers). Because the relationship between power and asymmetry is known, measured asymmetry variation may be corrected during write by applying a correction factor to the laser power.

Where the foregoing forward-sense process is used while writing data, as data is written (or read) at a circumferential location, the associated asymmetry at that circumferential location may be identified and correction to the laser output may be applied. As already discussed, the correction signal may be determined based on the measured asymmetry of the written data at the same circumferential location and the value of the forward-sense signal generated by the sensor control unit 144 based on the written data.

In some implementations, the correction signal may be used to correct minor variations in the disc (e.g., defects that are rather smooth but not abrupt imperfections such as scratches). As an example, the correction signal may be used to correct thickness variation of a disc substrate that may vary smoothly from thicker to thinner. This may result in a repeatable, periodic variation as the disc spins.

In some cases, this repeatability may not be the same for each spin when measured from ID to OD. Accordingly, in some implementations, disc writing may periodically be stopped and data reading may be performed at locations where data was written so as to measure the quality of the disc. At this time, a new correction signal may be determined that is synchronous to the rotation (circumferential). This process may be performed periodically at different radii of the disc to ensure that changes in the circumferentially repeatable variation may be tracked.

In some implementations, the optical system 118 may include additional electronic circuits to provide a drive current for driving the optical source 148 based on, for example, data clock or command from the controller 152 (which may include a microprocessor and the like). The controller 152 may receive readback signals generated by the sensor control unit 144 so as to assess the value of the detected asymmetry. In these implementations, if a deviation exits between the targeted asymmetry and the detected asymmetry, the control unit 146 (or the controller 152) may generate appropriate control signals to control the optical source 148 so to correct the optical power level correspondingly (e.g., corresponding to the difference between the targeted and the detected asymmetry).

While the foregoing descriptions focus on asymmetry parameters which yield the targeted asymmetry parameter $\beta_{Target}$ for establishing the relationship between the optical power level and the asymmetry, other parameters (as opposed to only those that coincide with the targeted asymmetry parameter $\beta_{Target}$) and the angular positions at which such $\beta$ parameters are measured also may be used to develop power-asymmetry relationship. In these implementations, the optical power levels corresponding to such $\beta$ parameters also may be identified and used to enhance the relationship(s) to minimize potential errors.

In some implementations, the correlation between the optical power and the asymmetry may further be enhanced by sweeping the optical power for a full cycle. For example, the relationship between the optical power and the asymmetry may be enhanced by sweeping the optical power from high to low and from low to high. In other implementations, more than one cycle may be used. For example, the optical system 118 may sweep the optical power from high to low, from low to high and from high to low again. Depending on a specific design application, greater or lesser number of cycles may be employed.

In some implementations, instead of measuring optical power level, optical tilt also may be used. In these implementations, a correlation between the optical tilt and the asymmetry may be developed. In some implementations, the asymmetry variation per rotation may be measured for different tilt settings. In these implementations, a dynamic tilt compensation waveform can be generated and applied during writing to regulate asymmetry at each circumferential location (e.g., at a constant power). By using the optical tilt as a parameter to determine laser power setting, it is possible to cancel out effects of undesired readback quality by dynamically adjusting tilt for each disc spin.

Figure 4:
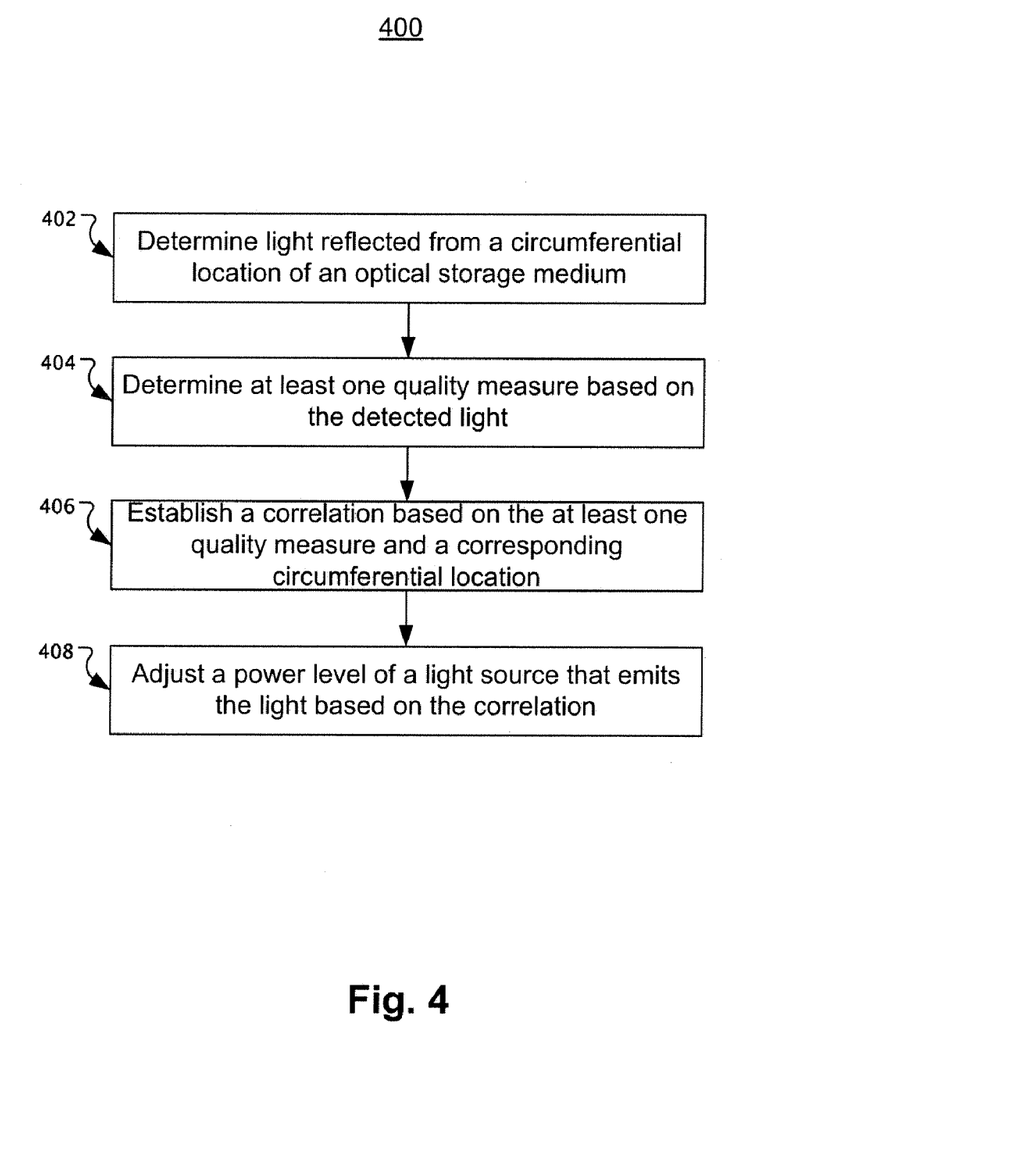
FIG. 4 shows an example process for determining a correction signal to adjust an optical power level of a light source.

FIG. 4 is an example process for determining a correction signal to adjust an optical power level of a light source. The process 400 may be performed, for example, by the ODD system 100, and for clarity of presentation, the description that follows uses the ODD system 100 as the basis of examples for describing the process 400. However, another system, or combination of systems, may be used to perform the process 400.

Process 400 begins with determining light reflected from a circumferential location (402). In some implementations, to determine light reflected from the circumferential location, a readback signal based on the determined light may be generated. In these implementations, an asymmetry may be determined based on the readback signal.

At least one quality measure based on the detected light may be determined (404). In some implementations, the at least one quality measure may include an asymmetry parameter.

A correlation based on the at least one quality measure and a corresponding circumferential location may be established (406). In some implementations, establishing the correlation based on the at least one quality measure and the circumferential location may include determining a difference between the asymmetry and a targeted asymmetry associated with the circumferential location.

The power level of an optical source may be adjusted based on the correlation (408). In some implementations, variations of the asymmetry over a plurality of circumferential locations including the circumferential location may be identified. Based on the identified variations, the power level of the light source may be determined and adjusted accordingly. In some implementations, the power level of the light source may de adjusted based on the correlation by determining a compensation signal that minimizes the difference between the asymmetry and the targeted asymmetry, and then adjusting the power level of the light source based on the compensation signal. In some implementations, subsequent data writing may be performed using the adjusted power level.

In some implementations, variations of the asymmetry over a plurality of circumferential locations including the circumferential location may be identified during writing. Similarly, the power level of the light source based on the identified variations may be adjusted during writing.

In some implementations, an average power level based on the correlation also may be determined. In these implementations, the power level of the light source may be adjusted using the average power level.

In some implementations, an optimum power level may be selected for each circumferential location based on the at least one quality measure associated with the circumferential location. In these implementations, a correlation based on the optimum power level also may be established for each circumferential location and associated quality measure.

In some implementations, one or more calibration areas also may be identified and light may be emitted onto the identified calibration areas. In some implementations, light reflected from the circumferential location may be determined that includes determining light reflected from the circumferential location corresponding to each identified calibration area. In some implementations, establishing the correlation based on the at least one quality measure and the circumferential location may include establishing the correlation based on the one quality measure with respect to the circumferential location corresponding to each identified calibration area.

In some implementations, operations 402-408 may be performed in the order listed or in parallel (e.g., by the same or a different process, substantially or otherwise non-serially) to achieve the same result. In other implementations, operations 402-408 may be performed out of the order shown. Also, the order in which the operations are performed may depend, at least in part, on what entity performs the method. Operations 402-408 also may be performed by the same or different entities or systems.

What is claimed is:

1. A method comprising:
   detecting light reflected from a circumferential location of an optical storage medium;
   determining at least one quality measure based on the detected light;
   establishing a correlation based on i) the at least one quality measure and ii) a corresponding circumferential location including:
      identifying a plurality of circumferential locations including the corresponding circumferential location on the optical storage medium,
      analyzing each circumferential location using a plurality of power levels, selecting, based on the analysis, a power level among the plurality of power levels as a selected power level for each of the plurality of circumferential locations, the selected power level yielding a desired value associated with the at least one quality measure at the corresponding circumferential location, and associating the at least one quality measure with the respective selected power level for the corresponding circumferential location; and adjusting, based on the correlation, a power level of a light source that emits the light onto the optical storage medium including adjusting the power level of the light source based on the respective selected power level to achieve the desired value at each of the plurality of circumferential locations.

2. The method of claim 1, where determining at least one quality measure includes determining an asymmetry parameter.

3. The method of claim 2, where adjusting the power level of the light source includes:

identifying variations of the asymmetry parameter over the plurality of circumferential locations including the corresponding circumferential location based on a readback signal generated in response to the detected light while reading the optical storage medium; and adjusting the power level of the light source based on the selected power level to minimize the identified variations.

4. The method of claim 3, where adjusting the power level of the light source is performed while writing data onto the optical storage medium.

5. The method of claim 4, where identifying variations of the asymmetry parameter over the plurality of circumferential locations including the corresponding circumferential location includes:

identifying variations of the asymmetry parameter over the plurality of circumferential locations including the corresponding circumferential location based on i) a readback signal generated during reading data at the corresponding circumferential location.

6. The method of claim 1, further comprising determining an average power level as the selected power level based on the correlation, where adjusting the power of the light source based on the correlation includes adjusting the power level of the light source using the average power level.

7. The method of claim 1, further comprising emitting light from the light source onto the plurality of circumferential locations.

8. The method of claim 7, where establishing the correlation based on the i) at least one quality measure and ii) a corresponding circumferential location includes:

establishing the correlation based on an optimum power level as the selected power level for each circumferential location and associated quality measure.

9. The method of claim 1, where detecting light reflected from the circumferential location includes generating a readback signal based on the detected light; and where determining at least one quality measure includes determining an asymmetry based on the readback signal.

10. The method of claim 9, where establishing the correlation based on i) the at least one quality measure and ii) the corresponding circumferential location includes:

determining a difference between the asymmetry and a targeted asymmetry associated with the corresponding circumferential location.

11. The method of claim 10, where adjusting the power level of the light source based on the correlation includes:

determining a compensation signal that minimizes the difference between the asymmetry and the targeted asymmetry; and adjusting the power level of the light source based on the compensation signal.

12. The method of claim 11, further comprising performing subsequent data writing using the adjusted power level.

13. The method of claim 1, further comprising:

identifying one or more calibration areas; and emitting light onto the identified calibration areas.

14. The method of claim 13, where detecting light reflected from the circumferential location includes detecting light reflected from the circumferential location corresponding to each identified calibration area.

15. The method of claim 14, where establishing the correlation based on i) the at least one quality measure and ii) the circumferential location includes establishing the correlation based on the one quality measure with respect to the circumferential location corresponding to each identified calibration area.

16. The method of claim 1, where:

detecting light reflected from a circumferential location includes detecting light reflected from the plurality of circumferential locations including the circumferential location;

determining at least one quality measure includes:

determining a plurality of quality measures including the at least one quality measure based on the reflected light associated with the plurality of circumferential locations; and establishing a correlation is performed based on i) the plurality of quality measures and ii) the plurality of corresponding circumferential locations.

17. An optical system comprising:

a sensor unit to i) receive an indication of light reflected from a circumferential location of an optical storage medium, and ii) to determine at least one quality measure from the received indication of light; and a control unit to:

establish a correlation based on i) the at least one quality measure and ii) a corresponding circumferential location, where the control unit establishes the correlation by:

identifying a plurality of circumferential locations including the corresponding circumferential location on the optical storage medium, analyzing each circumferential location with a plurality of power levels, selecting, based on the analysis, a power level among the plurality of power levels as an selected power level for each of the plurality of circumferential locations, the selected power level yielding a desired value associated with the at least one quality measure, and associating the at least one quality measure with the respective selected power level for the corresponding circumferential location; and adjust, based on the correlation and the respective selected power level, a power level of a light source that emits the light onto the optical storage medium to achieve the desired value at each of the plurality of circumferential locations.

18. The optical system of claim 17, where the sensor unit includes a forward sense diode to i) measure an optical power level of the received indication of light, and ii) control the light source based on the measurement.

19. The optical system of claim 18, where the control unit is configured to receive one or more forward sense setpoint values, and to compare the one or more forward sense setpoint values with the measurement to determine the power level of the light source.

20. The optical system of claim 17, further comprising the light source, where the at least one quality measure includes an asymmetry parameter that is associated with the light emitted by the light source.

21. The optical system of claim 17, where:
the sensor unit is configured to receive an indication of light reflected from the plurality of circumferential locations including the circumferential location; and
the control unit is configured to:
   determine a plurality of quality measures including the at least one quality measure based on the reflected light associated with the plurality of circumferential locations, and
   establish the correlation based on i) the plurality of quality measures and ii) the plurality of corresponding circumferential locations.

* * * * *